United States Patent
Haaren et al.

(10) Patent No.: US 10,452,659 B2
(45) Date of Patent: Oct. 22, 2019

(54) COMPATIBILITY CHECK FOR EXECUTION OF JOINS

(71) Applicant: SAP SE, Walldorf (DE)

(72) Inventors: Berthold Von Haaren, Heidelberg (DE); Christoph Weyerhaeuser, Leimen (DE); Johannes Merx, Heidelberg (DE); Julian Schwing, Heidelberg (DE)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 15/412,765

(22) Filed: Jan. 23, 2017

(65) Prior Publication Data

US 2018/0210921 A1 Jul. 26, 2018

(51) Int. Cl.
  *G06F 17/30* (2006.01)
  *G06F 16/2455* (2019.01)
  *G06F 16/28* (2019.01)

(52) U.S. Cl.
  CPC ........ *G06F 16/2456* (2019.01); *G06F 16/283* (2019.01)

(58) Field of Classification Search
  None
  See application file for complete search history.

(56) References Cited

U.S. PATENT DOCUMENTS

| | | | |
|---|---|---|---|
| 2008/0033907 A1* | 2/2008 | Woehler | G06F 16/24528 |
| 2009/0271693 A1* | 10/2009 | Rae | G06Q 40/04 |
| | | | 715/219 |
| 2010/0228789 A1* | 9/2010 | Macedo | G06F 9/45512 |
| | | | 707/803 |
| 2011/0289092 A1* | 11/2011 | Kumar | G06F 11/3476 |
| | | | 707/741 |
| 2013/0198165 A1* | 8/2013 | Cheng | G06F 16/21 |
| | | | 707/714 |

* cited by examiner

*Primary Examiner* — Alex Gofman
(74) *Attorney, Agent, or Firm* — Mintz Levin Cohn Ferris Glovsky and Popeo, P.C.

(57) ABSTRACT

Described herein includes processing various instruction sets configured for online analytics processing (OLAP) using a calculation engine. This allows OLAP configured instruction sets or calculation scenarios to be efficiently and effectively processed with the calculation engine during run time thereby preventing delays and errors during processing.

12 Claims, 5 Drawing Sheets ably processing

COMPATIBILITY CHECK FOR EXECUTION OF JOINS

TECHNICAL FIELD

The subject matter described herein relates to processing an instruction set configured for online analytics processing (OLAP) using a calculation engine.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS (IM-DBMS) available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, and the like, a different system than that on which a DBMS is executed.

Some database systems use in-memory on-line analytical processing (OLAP), such as for processing databases sized at several terabytes (or more), tables with billions (or more) of rows, and the like. In some database system, on-disk OLAP (e.g., "big data," analytics servers for advanced analytics, data warehousing, business intelligence environments, and the like) is used, such as for databases sized at several petabytes or even more, tables with up to trillions of rows, and the like. Instruction sets can be configured for processing by an OLAP engine and, for example, can join and/or provide views of one or more tables. Some instructions or features associated with such instruction sets are not compatible with engines other than OLAP engines. Therefore, processing of such instruction sets in a system that does not include an OLAP engine can result in processing errors and reduced processing speeds.

SUMMARY

Aspects of the current subject matter can include detecting a partitioning flag associated with data and processing the data based on the detected flag. In one aspect, a method can include detecting, by a calculation engine, a presence of a flag in an instruction set received by the calculation engine of a database management system. The flag can indicate the instruction set is compatible with an online analytical processor configured to skip a join instruction. The method can further include executing, by the calculation engine, the instruction set including the join instruction, when the flag is not detected in the received instruction set. Additionally, the method can include executing, by the calculation engine, the instruction set but skipping execution of the join instruction included in the instruction set, when the flag is detected in the received instruction set.

In optional variations, one or more of the following features can be included in any feasible combination. The detecting the presence of the flag can include detecting, by the calculation engine, a Boolean variable in the instruction set that is true. Additionally, the method can further include adding, during design time, the flag to the instruction set. The join can include a N:M join. The method can further include adding the flag to the instruction set to enable the instruction set to be executed by the calculation engine. The method can further include checking, by the calculation engine, whether the skipping of the join results in a processing error (e.g., wrong/other result with regard to result produced by OLAP engine) and executing the instruction set but skipping execution of the join, when the processing error does not occur.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
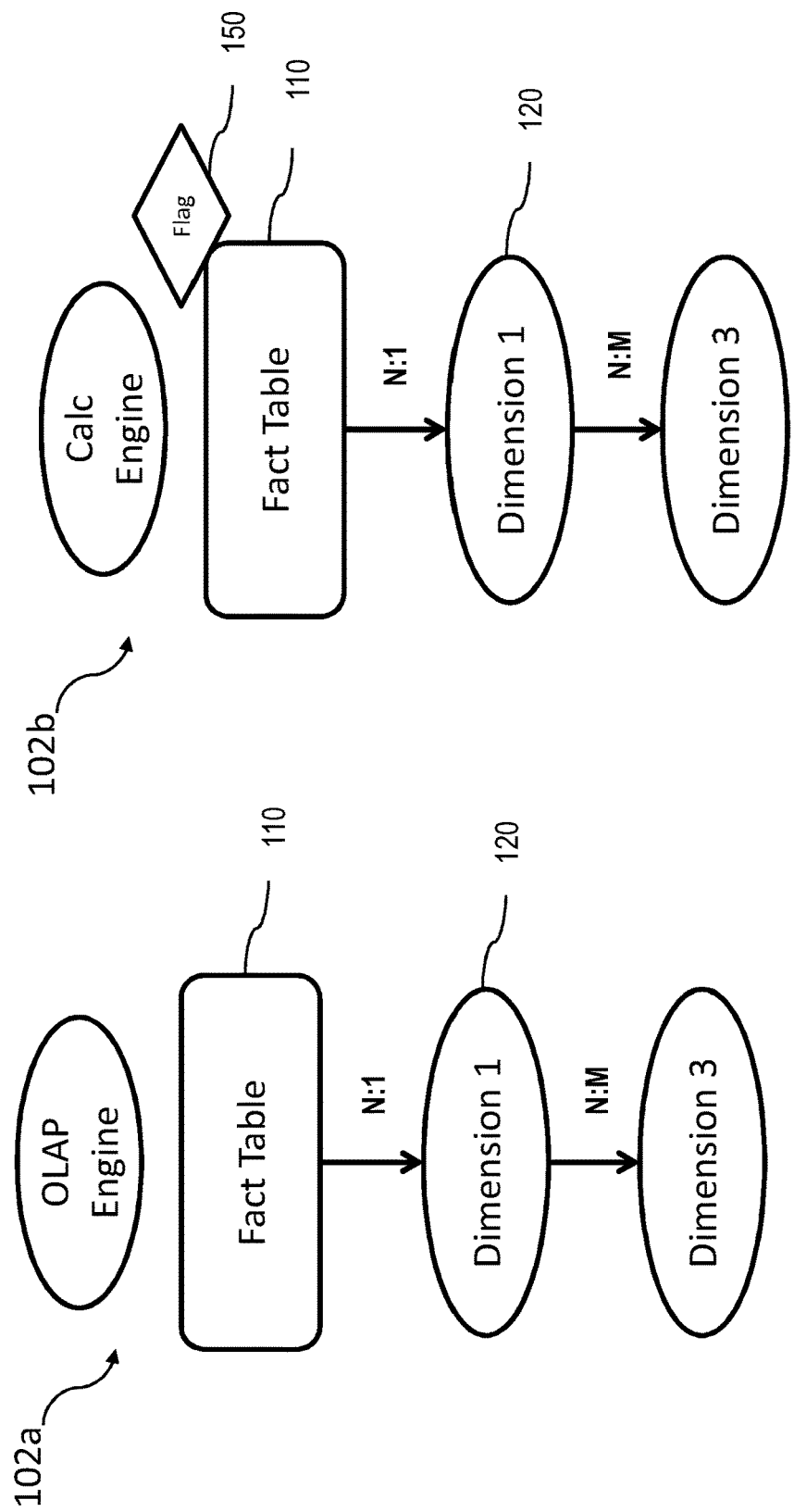
FIG. 1A shows an instruction set processed by an OLAP engine.
FIG. 1B shows the instruction set or calculation scenario of FIG. 1A including a flag added at design time to allow the calculation scenario to be efficiently and effectively processed by a calculation engine.

Aspects of the current subject matter include processing an instruction set configured for processing by an online analytics processing (OLAP) engine using a calculation engine. This allows systems that do not have an OLAP engine, but do have a calculation engine, to efficiently and effectively process OLAP engine configured instruction sets.

For example, OLAP can be an approach to efficiently answering multi-dimensional analytical (MDA) queries. An OLAP engine, for example, can be a part of a business intelligence, which can also include relational database, report writing, and data mining. A calculation engine can be based on table functions and table parameters. For example, the calculation engine can be configured to efficiently retrieve data from a database, perform calculations on the retrieved data, and write results to the calculations back to a database.

In some implementations, an instruction set configured for processing using an OLAP engine can include a join that joins two tables. The OLAP engine is configured to ignore joins, such as if a join is modelled as a N:M join, there are no force constraints along an execution path of the join, and/or there are no attributes requested from an outer part (e.g., dimension) of the join. However, a database calculation engine is configured to not ignore a join modeled as a N:M join, which can create a processing error (e.g., wrong/other result with regard to result produced by an OLAP engine) and slow down processing time. For example, a dimension of a table can indicate a type of data stored in the table, such as data based on an underlying data model of a star schema. Furthermore, calculation engines may not remove joins if their cardinality is N:M, however the flag described herein can provide an indication to the calculation engine regarding OLAP processing semantics.

As such, the present subject matter disclosed herein includes modifying OLAP engine configured instruction sets for efficient and effective processing using a calculation engine. For example, modifications to the OLAP engine configured instruction sets can be performed during design time and can include one or more flags added to the instruction sets. The added flags can include instructions and/or information that are presented to the calculation engine upon migration of the instructions set from, for example, a system including an OLAP engine to the calculation engine. Instructions and/or information included in the flags can alert the calculation engine to certain processing steps (e.g., joins) in the instruction set that should be ignored. For example, an OLAP engine is configured to ignore these certain processing steps. As such, by ignoring these certain processing steps, the calculation engine can simulate the OLAP engine when processing the instruction set having an added flag.

Furthermore, within some database management systems having IM-DBMS, such as HANA Deployment Infrastructures (HDI), the only supported modeling database artifacts are calculation views generated by a calculation engine. In order to simplify the database management system, these HDI's may not include an OLAP engine and may, instead, simply include calculation engines that can be more robust than OLAP engines. Although robust, the calculation engines can create errors when processing instruction sets configured for OLAP engine processing (e.g., creating OLAP views). Migration tools can be introduced in HDI's to migrate existing OLAP views into calculation views. However, after migration, the HDI must ensure that the query result generated by the calculation engine is identical to what would have been generated by an OLAP engine.

For example, an OLAP engine can be configured to extract and create views of data and a calculation engine can be configured to perform calculations and provide calculation views. An advantage of the subject matter disclosed herein includes instruction sets that can be processed by a calculation engine thereby allowing for a simplified system that does not include an OLAP engine and, instead, includes a calculation engine that can also mimic an OLAP engine.

There can be fundamental architectural differences between the OLAP engine and the calculation engine that can result in different results generated by the calculation engine compared to what would have been generated by the OLAP engine. These differences can include incorrect results even with a 1:1 data table conversion. Furthermore, as discussed above, the OLAP engine is configured to skip or remove joins, such as N:M joins (e.g., joins of tables having different dimensions). For example, the join can be skipped or removed when fields are not requested from an outer table and filters are not defined along a part of the instruction set including the join. For example, if a join is executed with a table containing sales representatives and sales transactions having more than one associated sales representative per sales transaction and the join is based on sales representatives, some of the sales transactions (e.g., ones having more than one associated sales representative) can be duplicated in error. OLAP engines are configured to omit these types of joins and thus prevent these types of errors.

For example, there can be a sales transaction with a value of 10 that is shared by sales representatives A and B. Executing a join to determine total sales can duplicate the transaction value thereby resulting in an error. For example, using the above scenario, a "select sum (sales)" query can return an incorrect value of 20 when the join is executed, and a correct value of 10 when the joint is not executed. To prevent from getting an error, a flag can be added to the instruction set to prevent the joining of sales representative A and B data (to result in an incorrect result value of 20) as the actual sales data is only 10. If, instead, the calculation scenario is modeled (e.g., includes a filter) such that only sales data from sales representative A is considered, then a total sales calculation would result in an error if sales representative B had an individual sale not shared with sales representative A. As such, calculation errors can be reduced or eliminated by including a flag that alerts the calculation engine of specific joins within an instruction set that are not to be performed.

In contrast, the calculation engine may execute N:M joins that have not been flagged as described herein. These joins can lead to unwanted results and performance differences between the OLAP and calculation engines. As such, the present subject matter includes adding one or more flags in an instruction set (e.g., during design time). The flag(s) can alert the calculation engine (e.g., during run time) that the instruction set is configured for an OLAP engine. This allows the calculation engine to simulate the OLAP engine and thus avoid errors from executing certain types of joins, such as N:M joins. One or more flags (including different types of flags) can be added to the OLAP configured instruction sets for detection by the calculation engine. For example, a flag can include a Boolean variable of the calculation scenario, which can be set to true in migrated OLAP scenarios. A flag can also include an instruction that is part of a query received by the calculation engine, which can be created during design time of the calculation scenario.

In some implementations, a calculation engine of a database management system can detect a presence of a flag in a received instruction set. The flag can indicate that the instruction set relates to an online analytics processing (OLAP) view of data from a database managed by the database management system. The calculation engine can determine that the received instruction set does not include a request for any attributes or definitions of filters on a part of the instruction set that includes the join, such as an N:M join. For example, an attribute or definition of a filter can specify a certain type of join. For example, if attributes are requested from an outer part (e.g., a dimension) of a N:M join or the dimension includes filters, then the join can be executed. Whether attributes are requested or whether there are filters in the outer join path may not affect the join type. Cardinalities can be optimized in an initiated model for the instruction set and the optimizing can include checking whether the part of the instruction set that includes the join can be reduced or pruned (e.g., ignored), and if so, ignoring the join. The model based on optimizing the cardinalities can be executed. For example, when the dimension is a simple table, a check for filters on the calculation node defining the table can be made. However OLAP scenarios can be more complex (e.g., representing a snow flake schema). As such, the calculation engine can search the whole scenario for filters eliminating all N:M joins for which no filters are found. The result of this operation can include a pruning of a top most N:M join, such as when no filters are found in a whole join tree. For example, if a join tree contains filters, the calculation engine can reduce the join tree based on where filters are found.

FIG. 1A shows an instruction set 102a that is configured for processing by an OLAP engine. As shown in FIG. 1A, the instruction set 102a includes taking a fact table 110 and running an N:1 conversion to provide a first view (Dimension 1) 120 of the fact table. The instruction set 102a further includes instructions to perform an N:M join. However, the OLAP engine will skip or remove the N:M join, such as when fields are not requested from an outer table and filters are not defined along a part of the instruction set that includes the join.

FIG. 1B shows the instruction set 102b or calculation scenario of FIG. 1A including a flag 150 added at design time to allow the instruction set 102b to be efficiently and effectively processed by a calculation engine. For example, the flag 150 can be visible in HANA studio under view properties of the calculation view. After detection of the flag 150, the calculation engine can ignore the N:M join if no fields are requested and no filters are defined along the part of the instruction set that includes the join. During optimization of the cardinalities in the instantiated model, the calculation engine can check whether an N:M join can be removed from the calculation scenario. If the check returns true, the part of the instruction set that includes the join can be ignored thereby ensuring the calculation engine simulates performance of the OLAP engine. Other parts of the instruction set (e.g., non-joins) may not be ignored and, instead, be allowed to be processed by the calculation engine.

During migration of the instruction set to the calculation engine (e.g., from a system having an OLAP engine) for processing, the flag 150 can be automatically added to the instruction set. As such, the present subject matter allows a calculation engine to process migrated instruction sets that were originally configured for processing by an OLAP engine. The calculation engine can mimic the OLAP engine when processing the migrated calculation scenarios to achieve the same outcome as if processed using the OLAP engine. With this conversion of analytic views to calculation views, more complex extensions and query execution can benefit from the model transparency towards the SQL optimizer.

Figure 2:
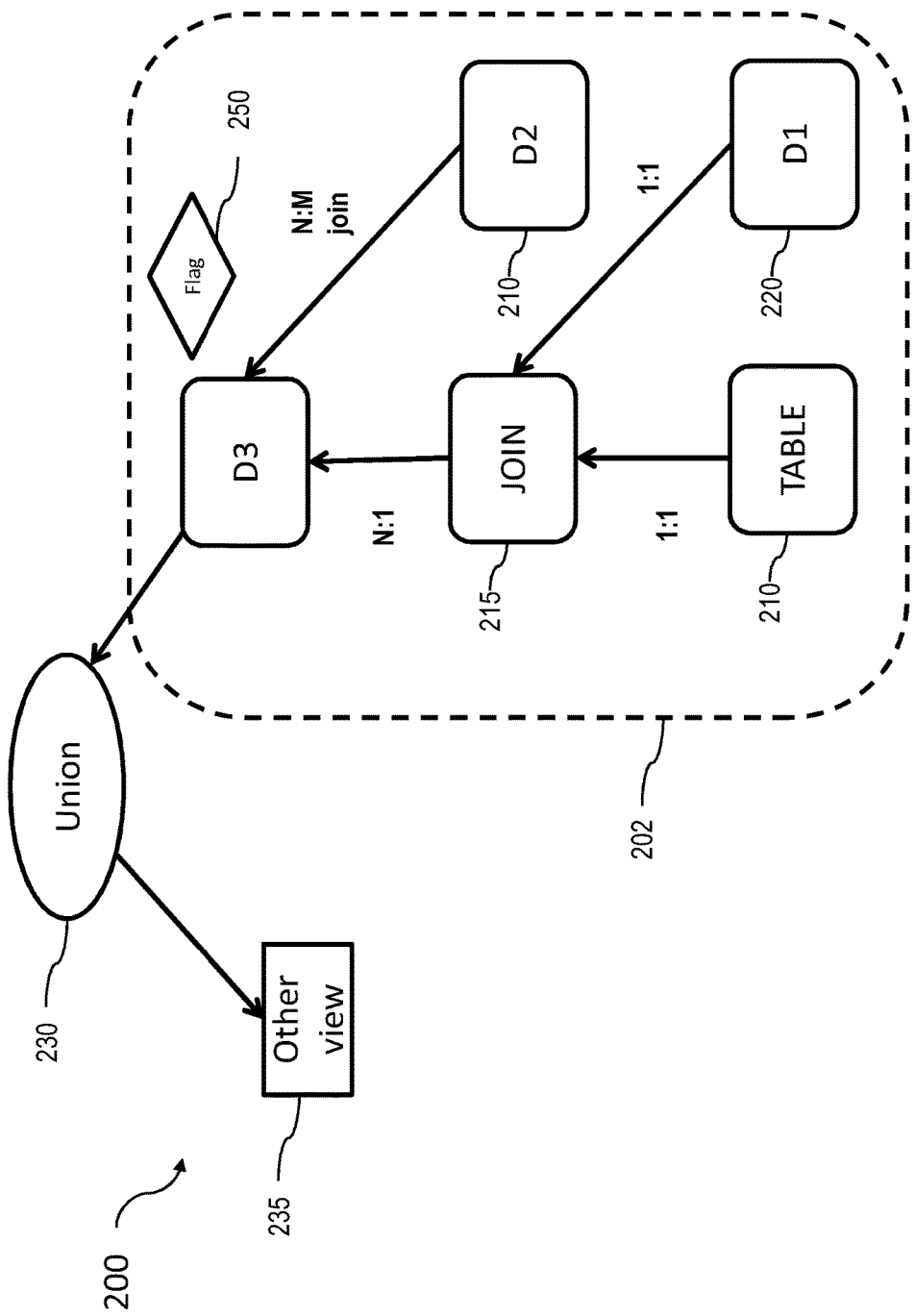
FIG. 2 shows a diagram illustrating the processing of a flagged instruction set or calculation scenario by a calculation engine, the result of which can be unioned to create other views.

FIG. 2 shows a process diagram 200 illustrating the processing of a flagged instruction set or flagged calculation scenario 202 by a calculation engine. The result of such processing of the flagged calculation scenario 202 can be further unioned (at union node 230) and provided as one or more views 235. As shown in FIG. 2, a table 210 can be converted and joined (at join node 215) with a first dimension table 220. A flag 250 added to the instruction set 202 can cause the calculation engine to skip the N:M join. As such, the result of the first join (at join node 215) can be unioned (at union node 230) and further processed for viewing (at 235).

Figure 3:
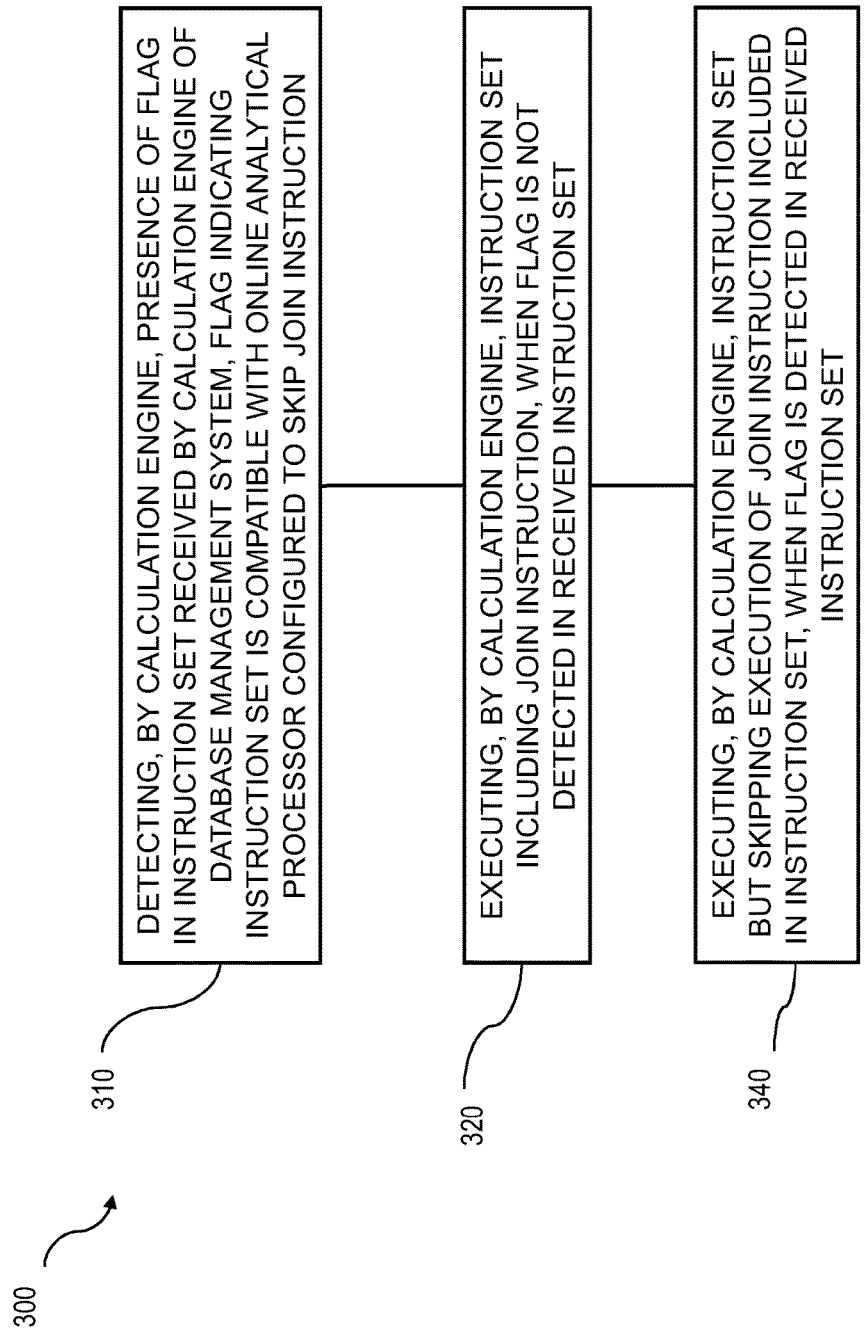
FIG. 3 shows a process flow diagram illustrating aspects of a method having one or more features consistent with implementations of the current subject matter.

FIG. 3 shows a process flow chart 300 illustrating features of a method consistent with one or more implementations of the current subject matter. It will be understood that other implementations may include or exclude certain features.

At 310, a calculation engine can detect a presence of a flag in an instruction set received by the calculation engine of a database management system. The flag can indicate that the instruction set is compatible with an online analytical processor configured to skip a join instruction. For example, the flag can include a Boolean variable that is true. As such, the flag can be detected by the calculation engine when the calculation engine detects a Boolean variable in the instruction set that is true. For example, if the calculation engine can detect a Boolean variable that is true in the instruction set, the calculation engine can check if a join (e.g., a N:M join) can be skipped during execution of the instruction set without resulting in a processing error. If the calculation engine determines that execution of the instruction set would not result in a processing error, the calculation engine can proceed with executing the instruction set and skipping the join.

At 320, the calculation engine can execute the instruction set including the join instruction when the flag is not detected in the received instruction set. For example, the default of the flag can be a Boolean variable set to false and when the flag is set to false the calculation engine may not detect the flag.

At 330, the calculation engine can execute the instruction set but skip execution of the join instruction included in the instruction set when the flag is detected in the received instruction set. The flag can be added during design time and/or during runtime. In some implementations, the flag can be valid for a first part of the instruction set and not valid for a second part of the instruction set. As such, the flag can be ignored during processing of the second part of the instruction set such that the flag is ignored by the calculation engine during execution of the second part of the instruction set. Furthermore, in some implementations, a join can be optimized when an instruction set does not include a request for attributes of an outer part of the join and the outer part of the join does not include a definition of a filter.

Figure 4:
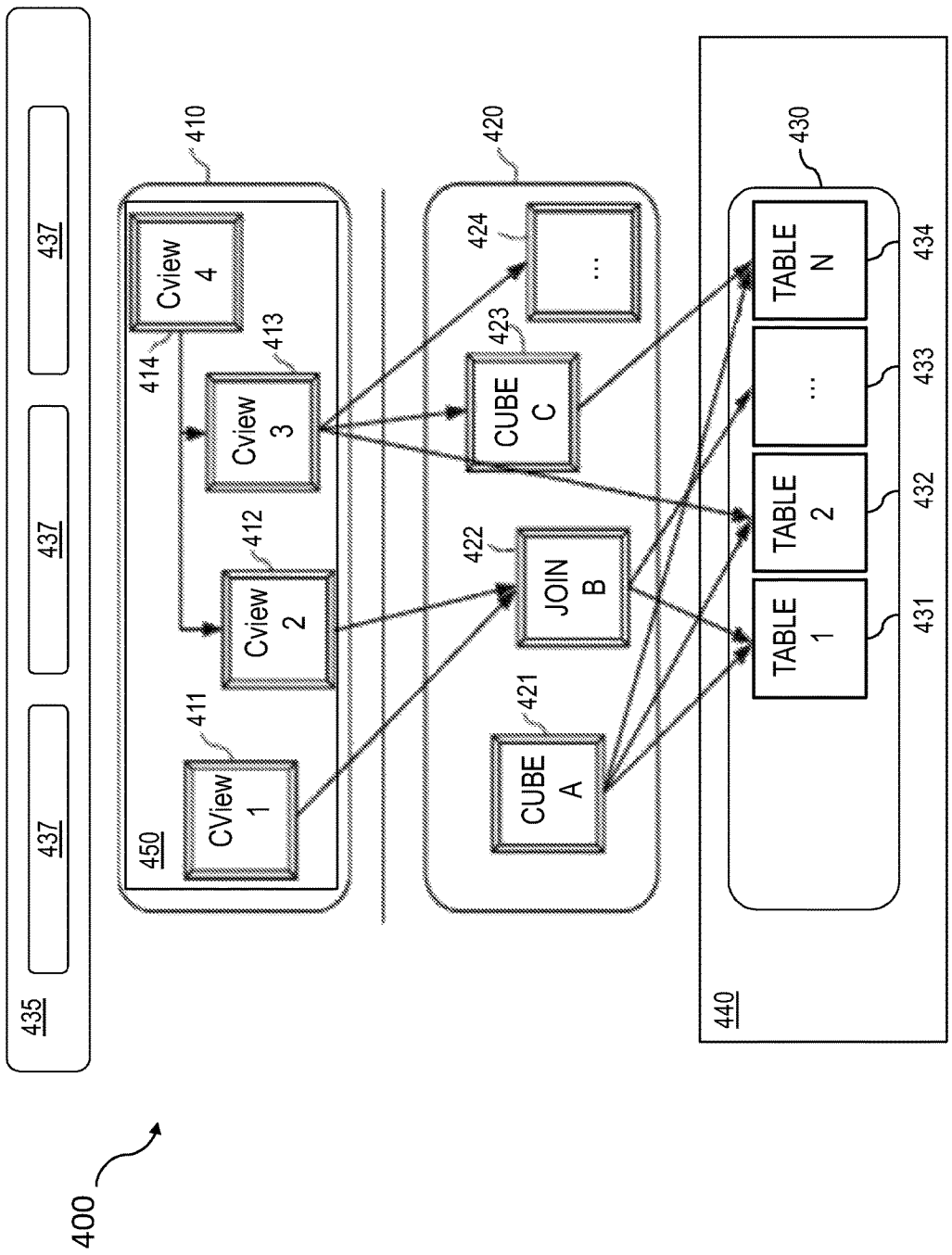
FIG. 4 shows a diagram illustrating a computing architecture consistent with implementations of the current subject matter including a database system that includes three layers: a calculation engine layer, a logical layer, and a physical table-pool.

FIG. 4 is a diagram that illustrates a computing architecture 400 that can detect the presence of a flag assigned to an instructions set for processing the instruction set according to at least the processing flow chart described above and shown in FIG. 3. As shown in FIG. 4, the computing architecture 400 includes a database system that has three layers: a calculation engine layer 410, a logical layer 420, and a physical table-pool 430. One or more application servers 435 implementing database client applications 437 can access the database system. Calculation scenarios can be executed by a calculation engine, which can form part of a database or which can be part of the calculation engine layer 410 (which is associated with the database). The calculation engine layer 410 can be based on and/or interact with the other two layers, the logical layer 420 and the physical table pool 430. The basis of the physical table pool 430 consists of physical tables (called indexes) containing the data, which can be stored on one more database servers 440. Various tables 431-434 can be joined using logical metamodels 421-424 defined by the logical layer 420 to form an index. For example, the tables 431-334 in a cube (e.g. an online analytical processing or "OLAP" index) can be assigned roles (e.g., fact or dimension tables) and joined to form a star schema. It is also possible to form join indexes (e.g. join index B 422 in FIG. 4), which can act like database views in computing environments such as the Fast Search Infrastructure (FSI) available from SAP SE of Walldorf, Germany.

As stated above, a calculation scenario 450 can include individual nodes (e.g. calculation nodes) 411-314, which in turn each define operations such as joining various physical or logical indexes and other calculation nodes (e.g., CView 4 is a join of CView 2 and CView 3). That is, the input for a node 411-414 can be one or more physical, join, or OLAP indexes or calculation nodes.

In a calculation scenario 450, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 450 can be created which can be reused by multiple queries even if such queries do not require every attribute specified by the calculation scenario 450.

Every calculation scenario 450 can be uniquely identifiable by a name (e.g., the calculation scenario 450 can be a database object with a unique identifier, etc.). Accordingly, the calculation scenario 450 can be queried in a manner similar to a view in a SQL database. Thus, the query is forwarded to the calculation node 411-414 for the calculation scenario 450 that is marked as the corresponding default node. In addition, a query can be executed on a particular calculation node 411-414 (as specified in the query). Furthermore, nested calculation scenarios can be generated in which one calculation scenario 450 is used as source in another calculation scenario (e.g. via a calculation node 411-414 in this calculation scenario 450). Each calculation node 411-414 can have one or more output tables. One output table can be consumed by several calculation nodes 411-414.

Figure 5:
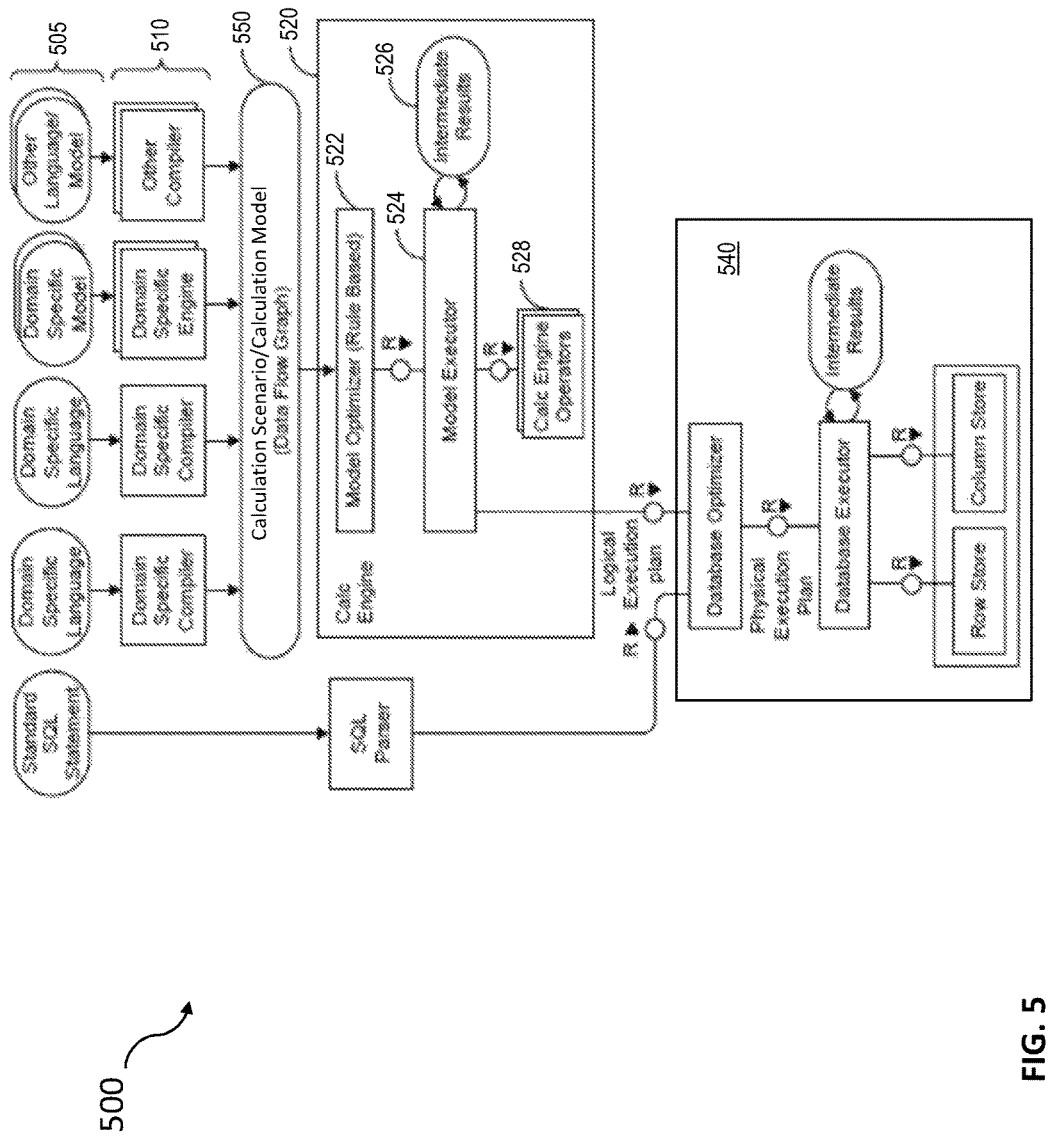
FIG. 5 shows a diagram illustrating a sample architecture for request processing and execution control consistent with implementations of the current subject matter.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 550 (which is also referred to in in FIG. 5 as a calculation model). Such calculation scenarios 550 can include any of the calculation scenarios or instruction sets described herein for processing with the calculation engine, such as described above and shown in FIG. 3. To achieve enhanced performance, the models and programs written in these languages are executed inside the database server 540. This arrangement eliminates the need to transfer large amounts of data between the database server 540 and a client application 437, which can be executed by an application server 435. Once the different artifacts 505 are compiled into this calculation scenario, they can be processed and executed in the same manner. A calculation engine 520 executes the calculation scenarios 550.

A calculation scenario 550 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 437 at the application server 435). Inputs can be connected to tables or to the outputs of other nodes. A calculation scenario 550 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 550 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 550 can be defined as part of database metadata and invoked multiple times. A calculation scenario 550 can be created, for example, by a SQL statement "CREATE CALCULATION SCENARIO <NAME> USING <XML or JSON>". Once a calculation scenario 550 is created, it can be queried (e.g., "SELECT A, B, C FROM <scenario name>", etc.). In some cases, databases can have pre-defined calculation scenarios 550 (default, previously defined by users, etc.). Calculation scenarios 550 can be persisted in a repository (coupled to the database server 540) or in transient scenarios. Calculation scenarios 550 can also be kept in-memory.

Calculation scenarios 550 are more powerful than traditional SQL queries or SQL views for many reasons. One reason is the possibility to define parameterized calculation schemas that are specialized when the actual query is issued. Unlike a SQL view, a calculation scenario 550 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 550 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 550. This instantiated calculation scenario 550 is optimized for the actual query and does not contain attributes, nodes or data flows that are not needed for the specific invocation.

When the calculation engine 520 gets a request to execute a calculation scenario 550, it can first optimize the calculation scenario 550 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 550. The model executor 524 can invoke the required operators (using, for example, a calculation engine operators module 528) and manage intermediate results. Most of the operators are executed directly in the calculation engine 520 (e.g., creating the union of several intermediate results). However, if the calculation engine detects a flag associated with the calculation scenario, one or more joins (e.g., N:M joins) of the calculation scenario can be skipped. The remaining nodes of the calculation scenario 550 (not implemented in the calculation engine 520) can be transformed by the model executor 524 into a set of logical database execution plans. Multiple set operation nodes can be combined into one logical database execution plan if possible.

The calculation scenarios 550 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 550 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

The attributes of the incoming datasets utilized by the rules of model optimizer 522 can additionally or alternatively be based on an estimated and/or actual amount of memory consumed by the dataset, a number of rows and/or columns in the dataset, and the number of cell values for the dataset, and the like.

A calculation scenario 550 as described herein can include a type of node referred to herein as a semantic node (or sometimes semantic root node). A database modeler can flag the root node (output) in a graphical calculation view to which the queries of the database applications directed as semantic node. This arrangement allows the calculation engine 520 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
   at least one processor; and
   at least one memory including program code which when executed by the at least one processor causes operations comprising:
   checking, by a calculation engine, whether skipping a first join instruction of an instruction set results in a processing error, the first join instruction being associated with an N by M join, the N by M join comprising a join of two tables having different dimensions;
   adding, during design time and in response to the checking not resulting in the processing error, a flag to the first join instruction associated with the N by M join;
   detecting, by the calculation engine, a presence of the flag in the instruction set received by the calculation engine of a database management system, the flag indicating the instruction set is compatible with an online analytical processor configured to skip the first join instruction associated with the N by M join;
   executing, by the calculation engine, the instruction set including a second join instruction; and
   executing, by the calculation engine, the instruction set but skipping execution of the first join instruction included in the instruction set, when the flag is detected in the received instruction set.

2. The system of claim 1, wherein the flag comprises a Boolean variable that is true.

3. The system of claim 1, wherein executing the second instruction set does not result in the processing error.

4. The system of claim 1, wherein the first join instruction is void of any filters.

5. A computer program product comprising a non-transitory computer-readable storage medium storing instructions that, when executed by at least one programmable processor, cause the at least one programmable processor to perform operations comprising:
   checking, by a calculation engine, whether skipping a first join instruction of an instruction set results in a processing error, the first join instruction being associated with an N by M join, the N by M join comprising a join of two tables having different dimensions;
   adding, during design time and in response to the checking not resulting in the processing error, a flag to the first join instruction associated with the N by M join;
   detecting, by the calculation engine, a presence of the flag in the instruction set received by the calculation engine of a database management system, the flag indicating the instruction set is compatible with an online analytical processor configured to skip the first join instruction associated with the N by M join;
   executing, by the calculation engine, the instruction set including a second join instruction; and
   executing, by the calculation engine, the instruction set but skipping execution of the first join instruction included in the instruction set, when the flag is detected in the received instruction set.

6. The computer program product of claim 5, wherein the flag comprises a Boolean variable that is true.

7. The computer program product of claim 5, wherein executing the second instruction set does not result in the processing error.

8. The computer program product of claim 5, wherein the first join instruction is void of any filters.

9. A method, comprising:
   checking, by a calculation engine, whether skipping a first join instruction of an instruction set results in a processing error, the first join instruction being associated with an N by M join, the N by M join comprising a join of two tables having different dimensions;
   adding, during design time and in response to the checking not resulting in the processing error, a flag to the first join instruction associated with the N by M join;
   detecting, by the calculation engine, a presence of the flag in the instruction set received by the calculation engine of a database management system, the flag indicating the instruction set is compatible with an online analytical processor configured to skip the first join instruction associated with the N by M join;
   executing, by the calculation engine, the instruction set including a second join instruction; and
   executing, by the calculation engine, the instruction set but skipping execution of the first join instruction included in the instruction set, when the flag is detected in the received instruction set.

10. The method of claim 9, wherein the flag comprises a Boolean variable that is true.

11. The method of claim 9, wherein executing the second instruction set does not result in the processing error.

12. The method of claim 9, wherein the first join instruction is void of any filters.

* * * * *